L. S. BACHE.
JOURNAL BOX.
APPLICATION FILED JULY 25, 1913.

1,189,905.

Patented July 4, 1916.

WITNESSES

INVENTOR
Leigh S. Bache,
BY
ATTORNEY

UNITED STATES PATENT OFFICE.

LEIGH S. BACHE, OF BOUNDBROOK, NEW JERSEY, ASSIGNOR TO THE GRAPHITE LUBRICATING COMPANY, OF BOUNDBROOK, NEW JERSEY, A CORPORATION OF NEW JERSEY.

JOURNAL-BOX.

1,189,905.

Specification of Letters Patent.

Patented July 4, 1916.

Application filed July 25, 1913. Serial No. 781,140.

*To all whom it may concern:*

Be it known that I, LEIGH S. BACHE, a citizen of the United States, and a resident of Boundbrook, in the county of Somerset and State of New Jersey, have invented certain new and useful Improvements in Journal-Boxes, of which the following is a full, clear, and exact description, whereby any one skilled in the art may make and use the same.

The invention relates to journal boxes or bearings and is more particularly directed to a journal box or bearing of the self-lubricating type, that is, one which does not require oiling but which, being composed of metal interspersed with a lubricating material provides for the constant lubrication of the metal parts.

It relates essentially to a journal box bearing either of solid or split construction formed from metal and having its bearing surface broken by a series of depressions which provide holders and distributers for the lubricating material which forms an essential part of the structure.

The object of the invention is to provide a bearing surface of metal and lubricant so disposed that the metal parts will always receive lubrication even upon slight oscillation of the bearing parts.

A further object is to provide struts or stiffeners longitudinally of the bearing to prevent upsetting or compression of the metal such as would tend to expel the lubricant.

Figure 1:
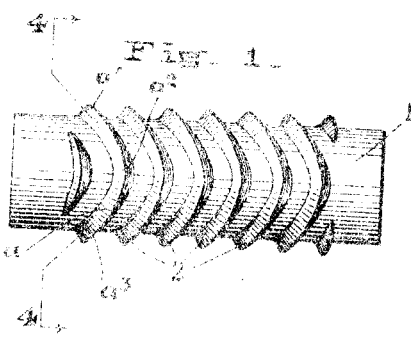
Figure 2:
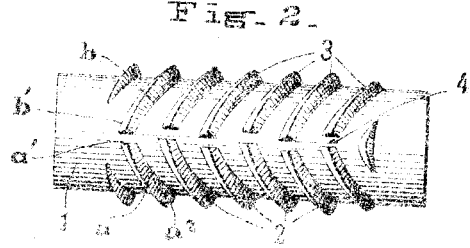
Figure 3:
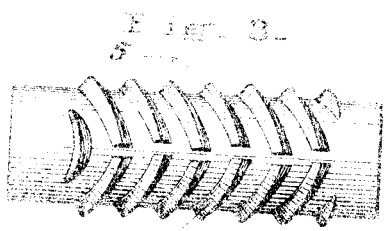
Figure 4:
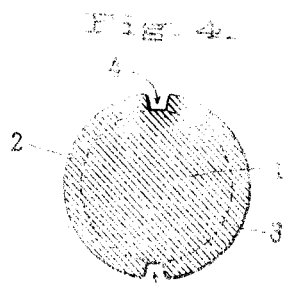
Figure 5:
Figure 8:
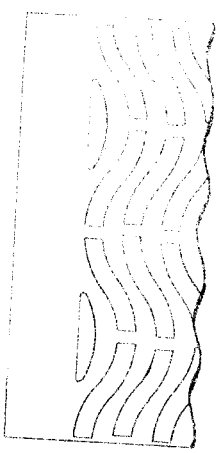
Figure 6:
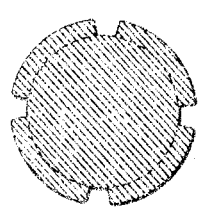
Figure 7:
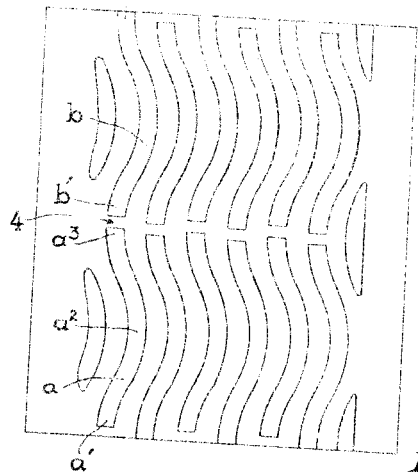

Referring to the drawings: Figure 1 is a view in side elevation of a core upon which the bearing shell is formed. Fig. 2 is a top plan view of the core illustrated in Fig. 1. Fig. 3 illustrates a modified arrangement of the longitudinal stiffeners and is a view of the core of Fig. 1 showing cut away portions to form the stiffener. Fig. 4 is a cross-sectional view through Fig. 1. Fig. 5 is a cross-sectional view through Fig. 3. Fig. 6 is a longitudinal section through a bearing formed on the core of Figs. 1, 2 and 4. Fig. 7 is a development of the core of Fig. 1 to illustrate the position of the spiral threading of the core or grooves of the bearing. Fig. 8 is a similar development of a portion of the core of Fig. 3.

It has not been an uncommon practice to form self-lubricating bearings from metal with inserted graphite or composition sections so disposed as to form a lubricant for the bearing.

The holders for the lubricant have been arranged in a great variety of forms but in order to secure sufficient lubricating qualities, the metallic portion of the bearing has been greatly weakened by cutting it away to provide holders for the lubricant.

In a co-pending application Serial No. 781,139, filed July 25, 1913, there is described a very efficient form of self-lubricating bearing having grooves of herring-bone type arranged in opposite halves of the bearing box and opposed in their spiral direction so that upon one half of the bearing, the herring-bones lie in one direction and in parallelism while in the other half they lie in the opposite direction.

The invention herein described is similar but embodies an arrangement of grooves which more efficiently provide for complete lubrication and are so disposed that following any groove about the bearing surface, it will be found that said groove reverses its direction at approximately every 90°. This arrangement insures complete lubrication upon a very slight turning movement of the bearing inasmuch as the lubricant will be carried to all parts of the metal surface. Furthermore, it stops any tendency of the lubricant to work out of the bearing and permits an arrangement of struts longitudinally of the bearing and the grooves of its surface which will act as a stiffener. Such a stiffener is found to be very essential, particularly in thin metal bearings where a maximum of wearing quality is desired with a minimum of thickness. By thickness is meant the difference in diameter between the interior bore and external finished surface of the bearing.

To best illustrate the invention, cores are shown upon which the bearings are formed by casting, although in Fig. 6 there is illustrated a half section of a complete bearing.

In the accompanying drawings, the numeral 1 denotes the core center which has disposed in parallelism upon its surface a series of ribs 2. These, as illustrated, are of substantially herring-bone type and extend from one side of the core to a point diametrically opposite.

On the opposite side of the core are arranged a similar series of ribs 3 but their direction of curvature is opposed to that of the ribs 2. From this it is apparent that there is no spiral rib which extends in one direction more than 90° about the periphery of the core. Take, for instance, the rib $a$ of Figs. 1 and 2 in connection with the development illustrated in Fig. 7. It starts at a point $a'$ just at one side of the center of the core and extends in a spiral direction to $a^2$ a distance of approximately 90° about the core, then reverses and terminates at $a^3$ just short of the center of the core at 180° of its circumference. Opposed to this over the opposite half of the core, is the rib $b$ which starts at the point $b'$, curves in a reverse spiral direction from that followed by the rib at the points $a^2$, $a^3$, to a point midway between $b^1$ and $b^2$, and then reverses through a distance of 90°, terminating at the point $b^2$.

The ribs on opposite halves of the bearing, as illustrated in Figs. 1, 2 and 7, are not continuous but are broken on diametrically opposite sides of the core as illustrated at 4 so that upon the core there is a space extending from end to end of the core between the adjacent ends of the spiral herring-bone ribs. These spaces are preferably arranged by leaving an opening between the adjacent ends of the ribs on opposite sides of the core which openings are somewhat staggered in each of the succeeding herring-bone ribs.

When cast, the openings in conjunction with the ribs, form a continuous staggered form of column or support extending from end to end of the bearing, the metal, when cast, of course filling the openings. By this arrangement there is a maximum amount of metal left in the bearing and as there is an unbroken metal surface extending from end to end of the bearing, there is no liability, in driving the bearings into place, of upsetting the metal about the grooves to such an extent as to expel the lubricating material which is molded into the grooves and vulcanized therein.

If desired, openings may be provided through the ribs at every 90° of the circumference of the core as illustrated in Figs. 3 and 8 and where it is necessary to provide a bearing in which the walls of the metal portion of the bearing are comparatively thin, it is important to use a structure of this form.

It will be observed that the openings between the succeeding ribs of any series are slightly offset with reference to each other so that upon a partial rotation of the shaft in the bearing, the lubricant will be carried over every intermediate surface of the metal.

Referring to Fig. 6 it will be noted that between the inside surface 5 and the exterior 6 of the bearing, there is a comparatively thin shell of metal and when this is weakened by forming grooves in the interior, the strength is materially diminished. Of course, there is all sufficient strength for sustaining the weight of the shafts when the bearing is in place but it is often quite essential that the bearings be driven into a bearing socket and if they are of comparatively thin construction there is liability of the metal crimping or compressing at the weakest point 7 adjacent to the bottom of the grooves to such an extent that the lubricant is forced out of its proper surface alinement with the interior metallic surface of the bearing.

The stiffeners formed by leaving metal between the adjacent ends of the grooves at diametrically opposite sides of the bearing or each 90° provide a continuous metallic stiffener of the full thickness equal to the different interior and exterior diameters of the bearing box and of course these stiffeners extend from end to end thereof. They absolutely prevent compression and crimping of the metal of the bearing under any ordinary use. These stiffeners also have an additional feature of advantage in that they provide a plurality of points and a weight-sustaining surface which will prevent the shaft working away the graphite with which the grooves are filled.

The exact pitch and formation of the spirals is of course quite immaterial as they may be arranged to suit the exigencies of any particular requirement. The main purpose of the invention is to provide grooves of substantially spiral formation broken into short spirals extending only approximately 90° about the surface of the bearing. It will be observed that parallelism is maintained between the grooves of any set for any 90° of surface but that there is a reversal in the direction of the spiral for every 90° whether the grooves terminate in the body of the metal to form longitudinally arranged struts at each 90° or at 180°.

What I claim as my invention and desire to secure by Letters Patent is:

1. A journal box consisting of an unbroken cylindrical shell having an interior series of lubricating grooves arranged in parallel spirals, said grooves being continuous for substantially 180° of the circumference of the journal box though reversing their direction at 90°, and a lubricant filling said grooves.

2. A journal box consisting of an unbroken cylindrical shell having interiorly arranged lubricating grooves arranged in a series of parallel spirals, said spirals reversing their direction at each 90°, throughout the shell said spirals being separated at substantially diametrically opposite sides of the bearing by unbroken metallic portions of the bearing and a lubricant filling said grooves.

3. A journal box consisting of an unbroken cylindrical shell having interiorly arranged lubricating grooves arranged in series in a spiral herring-bone formation, the spiral direction of the grooves reversing at each 90° about the entire inner periphery of the bearing surface and a lubricant filling said grooves.

4. A journal box consisting of an unbroken cylindrical shell having interiorly arranged lubricating grooves arranged in spiral herring-bone formation, the series in a spiral direction of the several parallel grooves reversing at each 90° about the entire inner periphery of the bearing surface, the continuity of said grooves being broken by interposed metallic parts at each 180° and a lubricant filling said grooves.

5. A journal box consisting of an unbroken cylindrical shell having interior lubricating grooves arranged in sets of parallel spirals extending substantially 90° about the bearing surface in one direction and reversing their direction for each succeeding 90°, said grooves being closed at each 90° point of reversal to provide continuous metallic supports from end to end of the bearing and a lubricating filling said grooves.

6. A journal box consisting of an unbroken cylindrical shell having interiorly arranged lubricating grooves arranged in a plurality of sets of parallel spirals extending substantially 90° about the bearing surface in one direction and reversing their direction for each succeeding 90°, said grooves being closed at each 180° to provide continuous metallic supports from end to end of the bearing and a lubricant filling said grooves.

LEIGH S. BACHE.

Witnesses:
 GEO. D. LEERALLEY,
 S. A. KING.